(12) United States Patent
Leslie

(10) Patent No.: US 7,239,412 B2
(45) Date of Patent: Jul. 3, 2007

(54) TRUE PRINT PREVIEW METHOD AND APPARATUS

(75) Inventor: Sara Lynn Leslie, Washougal, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 918 days.

(21) Appl. No.: 10/066,472

(22) Filed: Jan. 31, 2002

(65) Prior Publication Data

US 2003/0142325 A1    Jul. 31, 2003

(51) Int. Cl.
G06F 3/12    (2006.01)

(52) U.S. Cl. .................. 358/1.15; 358/1.15; 358/1.18; 358/527; 709/201; 709/231; 715/526; 715/527; 715/528; 715/529

(58) Field of Classification Search .............. 358/1.15, 358/296, 1.18, 527; 345/781; 709/201, 709/231; 715/526, 527, 528, 529
See application file for complete search history.

(56) References Cited

U.S. PATENT DOCUMENTS 5,963,216 A * 10/1999 Chiarabini et al. ......... 345/660
6,078,936 A * 6/2000 Martin et al. ............... 715/527
6,252,676 B1   6/2001 Azima et al. ................ 358/1.9
6,260,946 B1 * 7/2001 Hori ............................ 347/41
6,453,078 B2 * 9/2002 Bubie et al. ................ 382/305
6,614,454 B1 * 9/2003 Livingston .................. 715/781
6,621,590 B1 * 9/2003 Livingston ................. 358/1.15
2002/0016841 A1 * 2/2002 Hirashima et al. .......... 709/225
2002/0046238 A1 * 4/2002 Estavillo et al. ............ 709/203
2003/0007171 A1 * 1/2003 Simpson et al. ........... 358/1.15

FOREIGN PATENT DOCUMENTS

JP    2001246791 A    9/2001

* cited by examiner

Primary Examiner—Twyler Lamb
Assistant Examiner—Vu B. Hang
(74) Attorney, Agent, or Firm—Jon M. Dickinson, PC; Robert D. Varitz, PC

(57) ABSTRACT

A computer/printer system and method which includes and involves a screen-display device with a display screen, and wherein requests for a document print preview results in the direct and accurate creation by the printer per se of a true preview on the display screen showing how the document will actually look after printing.

1 Claim, 2 Drawing Sheets

TRUE PRINT PREVIEW METHOD AND APPARATUS

BACKGROUND AND SUMMARY OF THE INVENTION

This invention relates to a direct method and apparatus for creating a true print preview of a document which has been sent to the printer for printing. In particular, it relates to such a method and apparatus which, uniquely under the control of a printer, creates an exact electronic screen-display surrogate of such a document—a surrogate which precisely shows before printing how the particular printer involved will actually commit that document to an ink-on-paper hard copy.

The invention thus introduces and features printer-based, true-picture rendering of a document. Such rendering, significantly, costs neither paper nor ink, and effectively avoids the usual prior art mistake-bearing issues of ambiguity, surprise, and approximation—issues which have for years characterized mismatches between actual printed documents, and traditional pre-printing previews of these documents. Reference herein to a "printer" is intended to refer not only to "stand-alone", "single-purpose", dedicated printers per se, but also to so-called MFP (multifunction printing) devices with respect to which the invention has equal utility.

Briefly reviewing the prior art setting which the present invention addresses, a standard and widely employed option which has been offered for many years to users of document-generating applications in computers is the so-called print preview option. Typically, this option, when selected, results in the application, along with the associated printer driver, and occasionally other associated software, collectively generating a screen preview which is, at best, but a suggestion, and often a distant suggestion, of what the final printed document will actually look like. The usual document-producing applications cannot precisely know or detect the specific operational peculiarities and behaviors of the many different printers which may be used. A resulting consequence of this is that what the user typically sees in a requested preview is really just an approximation which often insufficiently matches what actually gets finally printed. Final printing parameters, such as fonts, positional formatting, how well a particular document will "fit to paper", and other document-appearance matters, ultimately lie in the "hands" of the particular printer which is employed, and only that particular printer "knows" exactly what will come out in the final printing.

Given this approximation situation, correctly guessing how to style and build a document to avoid unwanted final printed characteristics is an uncertain "science", and many times a user must go through several time-consuming trial iterations and unsatisfactory printings to achieve a satisfactory final look.

One approach which has been made in the past to resolve the print-preview issues mentioned above involves installing in a computer suitable additional programming software which is intended to emulate the expected behavior of the print engine in the particular printer. Such an approach is costly, involves only a single-style printer, and still only offers a best-guess approximation of how the particular employed printer will perform. Printers, even though nominally identical in model numbers, and supposedly armed with identical print engines, are individuals, and as such often have printing personality quirks which cannot be predicted, and confidently and accurately reflected in after-market installed emulation software. Additionally, the typical single-printer characteristics of such added emulation software make that software effectively useless when a change is made to a different printer.

Thus, the two traditional approaches employed in the creation of a print preview—(a) generation of a preview effectively by the document-creating application and the installed printer driver, and (b) generation of a preview under the control of an extra installed software emulator of an associated printer's print engine—do not often work very well.

According to the invention, and by way of sharp contrast with the prior art, the responsibility for generating a document preview is given directly to the very printer which is to print the document, rather than, as is currently conventional, to the computer-resident application which created the document, or to an installed surrogate print-engine emulator.

With one, or several, conventional document-creation applications installed in a user's computer (also referred to herein as computer structure), the user creates a document, and "sends" that document, by way of computer-sent instructions, to an associated printer. Such an associated computer and printer constitutes a computer environment herein. Effectively, these sent instructions tell the printer to create an appropriate print-control data stream (or collection) in its controller for ultimate use by the printer's print engine to print directly a hard copy of the document.

Along with the sent document, the user requests that the printer, before printing a document hard copy, effectively create electronically, and on an appropriately associated display device with a display screen (a viewing instrumentability), a visual-surrogate preview of the just sent document. The user may either simply request such a preview without implementing any additional document-appearance or other protocol options, or may, according to one form of the invention, choose various options, such as those selected from a list including, for example, document data format, printing color format, gray-scale, compression, resolution, thumbnail preview representation, and others.

With or without such selected options, the printer controller, ultimately creates an appropriate print-control data stream (or collection). This data-stream (collection) the printer may then store on its own internal storage structure, such as a hard drive, if it has one, and/or from the collection create what is called herein a related print-preview data stream that is effectively an exact copy of the print-control data stream. In one embodiment of the invention, the printer sends this print-preview data stream back through the computer to the associated screen-display device, either right away, or appropriately later if internal data storage has taken place. In some instances, such as, for example, where the printer is one which has its own screen-display hardware, this "sending" activity may take place entirely within the printer per se.

The display device then presents on its screen to the user an absolutely true preview of the created document, all selected options implemented, and just as the document, if no revisions are made, will be printed into hard copy by the printer's print engine. Such a preview gives the user precise and accurate information from which predictably implementable revisions can intelligently be made—all before actual printing. All behavior peculiarities and nuances linked to the particular printer will have played their respective roles in the preview which the user sees.

In a manner of speaking, therefore, the present invention responds to a print preview request by instructing and asking the printer itself to create such a preview, using the very same printer-generated, print-engine control data which would, in the absence of such a request, directly control the printing of a hard copy. The actual "voice and signature" of the printer therefore "speaks" and appears in such a preview—a preview which is absolutely true, without uncertainty, without ambiguity, without error and without unwelcome surprise.

The method and structure of the invention can work readily in many computer environments, including those wherein (a) a computer, a printer and a display device are separate components, (b) a computer and display are integrated (as in a laptop computer unit), (c) a printer and a display device are integrated, (d) the printer is incorporated in an MFP device, and so on.

These and other new and distinguishing features of the present invention will become more fully apparent as the description thereof which now follows is read in conjunction with the accompanying drawings.

DETAILED DESCRIPTION OF, AND BEST MODE FOR CARRYING OUT, THE INVENTION

The method and structure of the present invention are described and illustrated herein in relation to otherwise conventional computer, printer, display, and related software technology. These method and structure aspects of the invention are fully illustrated herein in block/schematic system diagrams, and in maplike block representations of the logical-flow architecture of the method steps and the related structure. To simplify the drawings, a conventional data-flow arrow is drawn only in FIG. 5, and here, only at the base of the figure to represent the true preview output of the printer. These block/schematic diagrams are presented in such a way that those generally skilled in the art will readily be armed to practice all aspects of the invention, bringing in their own, individual preferences. It will also be apparent that the features of the invention can readily be incorporated into many computer/printer environments. They can also easily be retrofitted in already existing environments.

Figure 1:
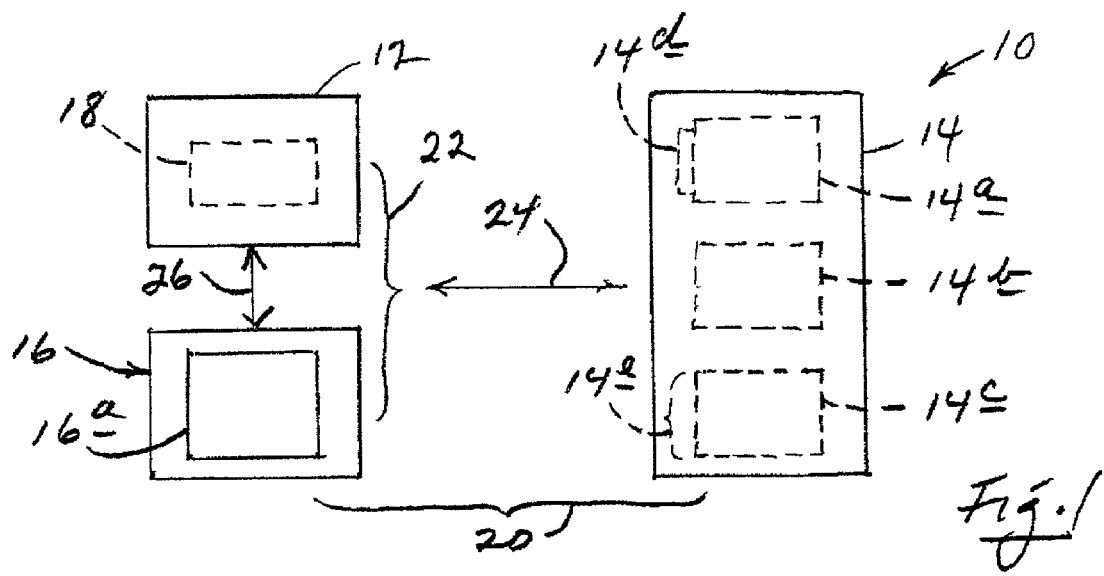
FIG. 1 is a block/schematic diagram illustrating one form of a computer/printer system which is constructed, and which operates, in accordance with the present invention. This particular system employs a computer, a printer and a screen-display device which are separate components. The printer shown here may either be a singular-function printer, or it may be a portion of an otherwise conventional MFP device of the type generally mentioned above.

Turning attention now to the drawings, and first of all to FIG. 1, indicated generally at 10 is a computer/printer system, also referred herein as a computer environment, constructed and operable in accordance with the present invention. System 10 includes, as interconnected independent components, a computer 12, a printer, or printer device, 14, and a screen-display device 16, such as a conventional, free-standing computer monitor. Except insofar as system 10 is intended to operate, and is configured to operate, in accordance with the present invention, the several components in this system, and the communication interconnections therebetween, are otherwise entirely conventional in construction and operation.

Represented schematically by a dashed-line block 18 which is pictured within computer 12 is (are) one or more document-creating application(s) of any conventional character. For example, application block 18 might include Microsoft's Word® and Excel® software programs.

Printer 14, may be a single-purpose printer, or it may be what is referred to as a multifunction printing (MFP) device. Integrated within printer 14, and pictured by dashed blocks 14$a$,14$b$,14$c$, respectively, are a printer controller, an internal hard-drive storage device, and a print engine. While printer 14 is shown specifically herein as one which includes a hard-drive type storage device, other forms of internal data storage could be employed as well. The invention can also be used just as well with printers that do not include internal storage capability. Further included in printer 14, and indicated by a small dashed-line rectangle 14$d$, is what is referred to as herein as input structure in the printer. A small dashed-line bracket 14$e$ represents what is referred to herein as output structure in the printer.

Shown generally at 16$a$ within block 16 (which represents the screen-display device) is the display screen in that device.

Still referring to FIG. 1, a bracket 20 represents the print-preview enabling structure and the methodology of the present invention which are incorporated into system 10. Such incorporation can result in a number of ways, preferably by manufacture pre-configuring of the printer to respond appropriately to requested print previews, and/or by suitable software installation of the printer/computer communication software, including the printer driver. In relation to a printer which has not been specifically preconfigured to perform in accordance with the invention, it is possible, simply through the route of employing appropriate aftermarket software, to "arm" such a printer to create true print previews as proposed by the invention. Those skilled in the relevant art, after reviewing the content of FIG. 4 herein, will clearly see how such "retrofitting" can be accomplished.

A bracket 22, along with a double-ended arrow 24, represent the operative associations and connections which exist between printer 14, computer 12 and display device 16. A double-ended arrow 26 represents the operative association and connection which exists between computer 12 and display device 16.

Figure 3:
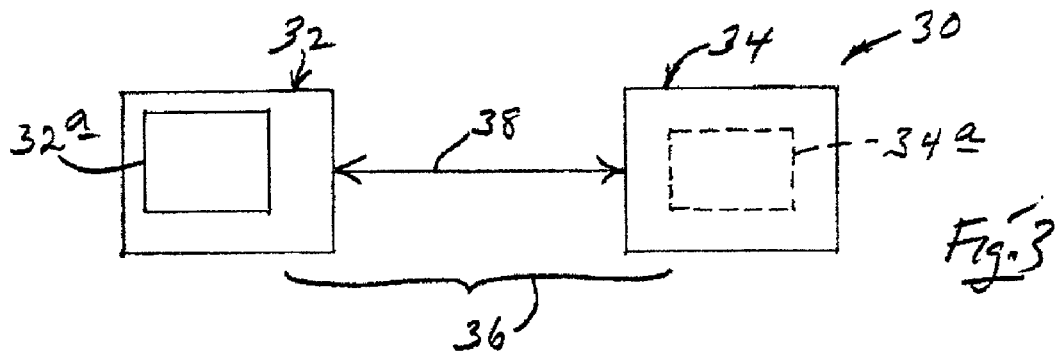
FIG. 3 is a block/schematic diagram illustrating another form of a system built and operable according to the invention. In this system the screen-display portion is integrated in a laptop computer.
Figure 4:
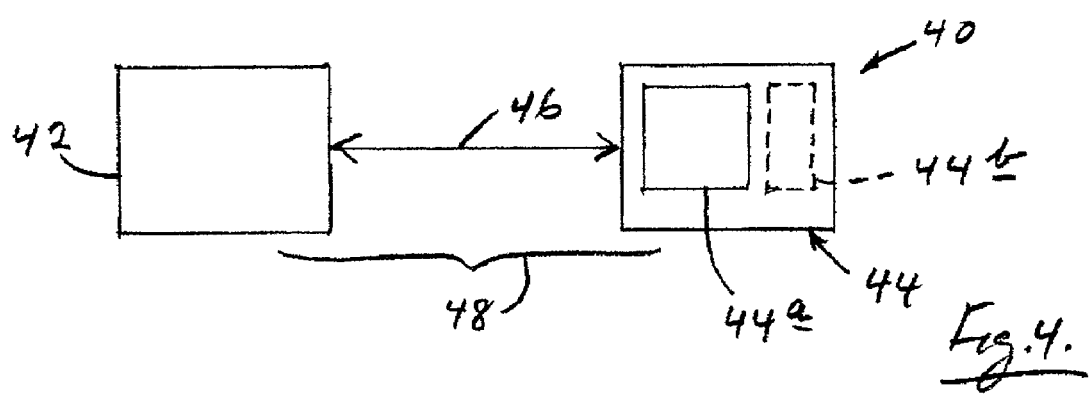
FIG. 4 is yet another block/schematic diagram of a system wherein the screen-display portion is integrated in a printer.

Digressing for a moment now to FIGS. 3 and 4, these two figures illustrate two systems which differ only modestly from system 10. FIG. 3 illustrates at 30 computer/printer system which is constructed with two separate components, including a computer 32 and a printer 34. Here, computer 32 is a laptop-type computer which includes its own internal screen-display device having a display screen shown at 32$a$. Printer 34 can be any printer of same category referred to above with reference to FIG. 1. Dashed block 34$a$ shown within printer 34 represent essentially the same elements pictured in FIG. 1 which are there designated with reference characters 14*a*-14*e*, inclusive. A bracket 36 represents the incorporated print-preview enabling structure and methodology of present invention. Double-ended arrow 38 represents the operative association and connection existing between computer 32 and printer 34.

FIG. 4 illustrates at 40 yet another computer/printer system which differs somewhat from previously discussed systems 10 and 30. System 40 includes a computer 42 which is operatively associated with, and connected to, a printer 44 which includes its own internal screen-display device. The operative connection here between the computer and the printer is represented by double-ended arrow 46. The printer's display screen is shown at 44*a*. A dashed block 44*b* represents the same componentry within printer 44 as does previously mentioned dashed block 34*a* with respect to printer 34 in FIG. 3. A bracket 48 represents in system 40 the presence of the print-preview enabling structure and methodology according to the present invention.

As will become apparent, except with respect to the specific structural differences pictured in systems 30 and 40 regarding the locations of screen-display structure, these two systems operate fundamentally in the same manner which will now be described with reference specifically to system 10.

Figure 2:
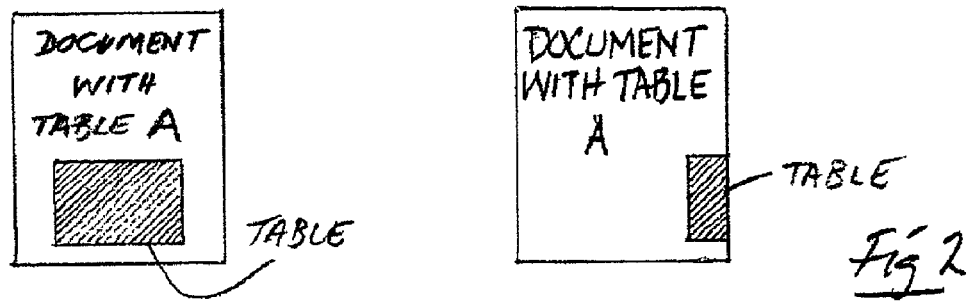
FIG. 2 is a simplified, two-illustration view picturing, on its left side, a stylized representation of how a created document is intended to look according to the user-creator, and on its right side, a similar representation of how a conventional computer/printer system might end up actually differently printing the document. These two illustrations, which can also be thought of as being screen-display previews, assist in explaining how the method and structure of the present invention work.
Figure 5:
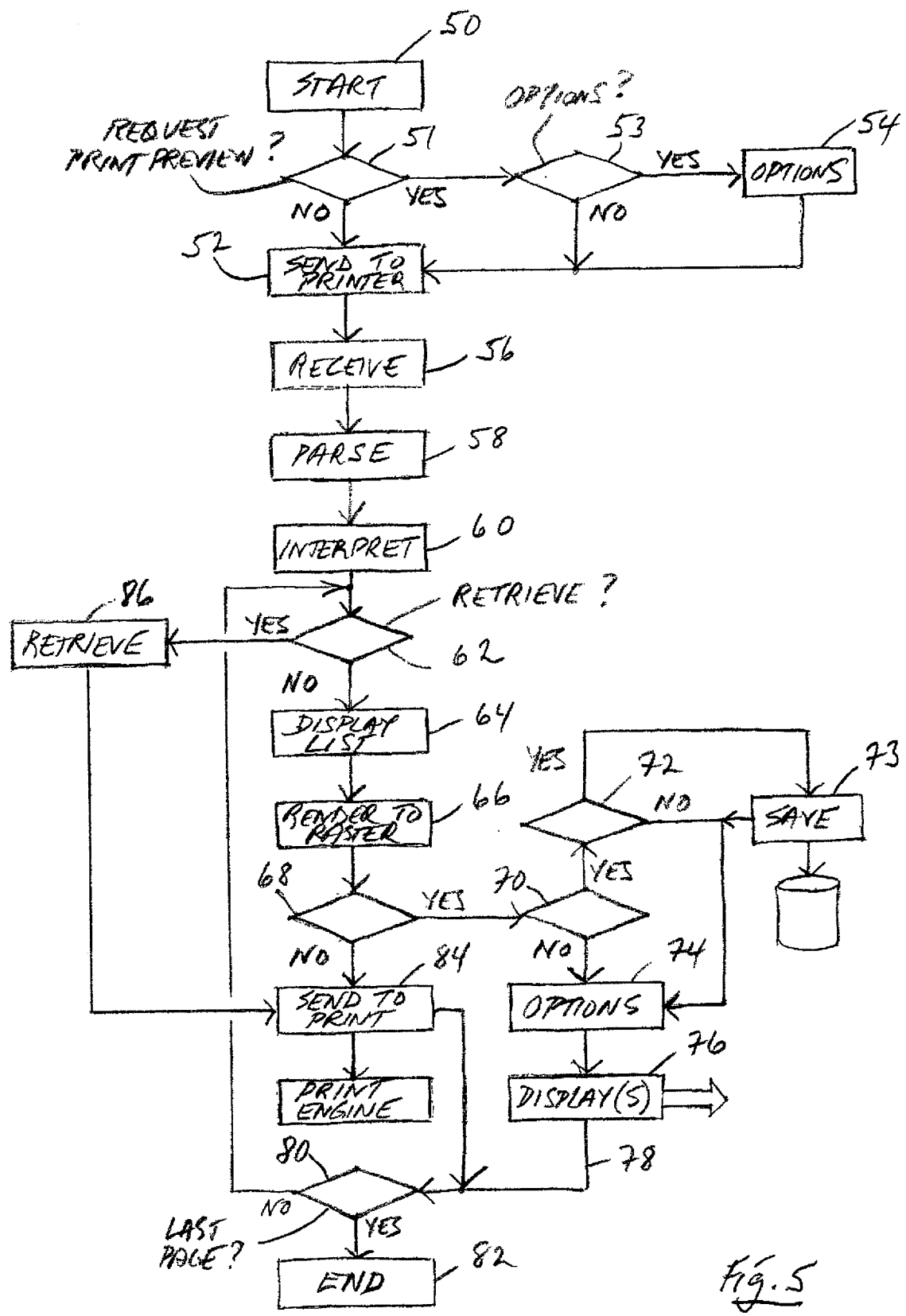
FIG. 5 is a block/schematic flow diagram which specifically illustrates the architecture and the logic of the structure and methodology of the present invention.

Accordingly, turning attention back to FIG. 1, and adding thereto reference to both FIGS. 2 and 5, in preparation for document printing various steps are performed by a user to create the related document. These steps, as well as steps taken to request and employ true print previewing of pages in the document in accordance with practice of the present invention, are fully expressed graphically in FIG. 5 which is specifically configured, nominally, to picture the print-preview enabling structure in system 10. The implementing of these steps, and the logical flow of data in relation to selected options, decisions and activity branching points, will now be presented principally through reference to FIG. 5.

The operation which is now to be described begins with the user of computer 12 creating a document employing one or more of the document-creation applications stored in the computer. This activity is represented in FIG. 5 by START block 50. As the document is initially created, the user typically will see on the display-screen in screen-display device 16 a representation of each page as such is created, and very typically this representation will accurately reflect what it is that the creator wishes to have as the final look of the document pages. The illustration presented at the left side of FIG. 2 represents such a document, and here one can see that the user has given this page, which will now be treated here as the full document, a certain title with a certain font type and size, a certain line layout, and a certain physical relationship of words, etc. to a graphical table of data. The user will create this document with the arrangement, look and sizing of components he or she feels is most appropriate, and this (the left side of FIG. 2) is what the user will see in the document-creation application screen at the completion of document creation.

In a system not employing the present invention, were the user to ask at this point for a print preview after creating the single-page document just described, that preview would, in all probability, look either exactly like, or very much like, what appears on the left side of FIG. 2. Such a preview would typically have been created by the document-creating application, in close collaboration principally with the computer-installed printer driver for the associated printer, or it might have been generated by an installed print-engine emulator of the type discussed earlier. In the latter situation, it is possible that the presented preview might more nearly look like what the printer will actually print, which could well be somewhat different, but for the reasons outlined above, that is only a possibility, and not an assured condition.

With the document so created, however, and according to the present invention, the user is now given the opportunity to choose to receive, or not to receive, and view a true pre-printing preview of the created document—a preview which will show on display-screen 16*a* a true visual surrogate of the document that will actually be printed by printer 14 based upon the instructions for printing which are about to be sent to the printer from computer 12. This opportunity is represented by decision block 51 in FIG. 5.

If the user does not elect to receive a true print preview, electing rather at this point simply to print the document, then the NO exit path from block 51 is followed, and a request for, and instructions relating to, printing are sent to printer 14 via block 54. As it turns out, and for illustration purposes herein, printer 14 is one with respect to which what the user sees on screen 16*a* as the hoped-for appearance of the application-created document (the left side of FIG. 2) will not actually be printed by this printer. Rather, because of the particular construction and configuration of printer 14, this document will be printed with some important differences, several of which are generally illustrated on the right of FIG. 2. Here what one can see is that the font which was selected by the user has been changed by printer 14 to some (unknown to the user) available default font which the printer has been constructed to implement when it is unable to respond to a request to employ the particular font selected by the user. Further, the chosen default font may not print in the same character size which the user has selected, with a result that the text actually printed may end up with words, etc. landing in different lines of text. Further, the data table which has been created by the user at a particular size and with a particular positioning on the anticipated page may, because of the printer's individual peculiarities, not be producible in the desired fashion, and may end up (as suggested on the right side of FIG. 2) looking significantly distorted, and even being incomplete, and/or distributed onto two pages.

If, however, the user wishes to avoid these kinds of conventional printing problems, he or she can elect according to the invention to receive a true print preview. With such an election, the YES exit path from decision block 51 is employed, and this leads, according to the particular embodiment of the invention now being described, to offering the user several additional options which may relate to print appearance and print protocol. Decision block 53 in FIG. 5 is here involved, for example. The user may be provided the opportunity to select for printing (a) a particular color format, such as one of the key conventional CMYK or RGB formats, (b) a gray-scale presentation, (c) a bi-tonal format, (d) a particular printing resolution, (e) a particular bit depth (f) a certain compression ratio, (g) the opportunity to receive a thumbnail-type presentation of a true print preview, and (h) various other such options. If such options are elected, the YES exit path from block 53 is employed, and leads to options block 54. By operation of block 54, appropriate option data is included by the computer in the request and instructions thereafter sent to printer 14 via previously mentioned block 52. If no specific, selectable options are consciously chosen by the user, appropriate, normal default conditions and statuses will be implemented.

Progressing now from block 52 through the balance of the operational logic pictured in FIG. 5, the created document data, also referred to herein as a print-instruction data stream, along with the request for a true print preview, and any selected option data, are sent to printer 14. All of this instruction data is received (block 56), parsed (block 58) and interpreted (block 60) by and within printer controller 14a, of which blocks, 56, 58, 60 are portions. Block 56 constitutes input structure in the printer, and block 60 interpretation structure.

With printer 14 including a storage device 14b in the form herein of a hard drive, logic flow out of block 60 goes to decision block 62 which queries whether what should next happen is the retrieval of document page data which has previously been stored on the hard drive. The YES exit route from block 62 (which will be discussed more fully shortly) is one which becomes active in a situation where no print preview has been requested. The NO exit route, however, is the one which is now relevant to the above-mentioned request for a true print preview.

And so, where, as here, the user has elected to request a true print preview, the active route out of block 62 is the NO route. From this point, the data from block 60 is processed successively in blocks 64, 66 which form part of printer controller 14a and wherein a display list for each document page (block 64), and appropriate raster data for each page (block 66), are respectively prepared. From block 66 the outflowing data stream is referred to herein as a print-control data stream, and it is this data stream which has appropriate characteristics, without there being any necessary further data manipulation, to drive the printer's print engine 14c, and to effect thereby the printing of the user's created, single-page document. This data stream, at this point in time, if directed to initiate immediate printing, will reflect (through operation of the print engine) the printing peculiarities of printer 14, and will cause the printing of a document which will look like the right side of FIG. 2. Such, however, is not what will now occur, inasmuch as the user has requested printer 14, via operation of the present invention, to create, first, a clearly viewable, accurate, true print preview to show on screen 16a just how such a printed document would turn out.

Accordingly, the print-control data stream thus generated within printer 14 now engages decision block 68 which confirms whether or not there has been a request for a true print preview. The YES confirmation which occurs in the illustration now being described passes control to decision block 70, wherein a determination is made about whether to send the print-control data for storage on the hard drive. If the answer is YES, downstream decision block 72 checks whether there is sufficient available storage space, and if the answer here is also YES, the data stream travels via SAVE block 73 to the hard drive device, wherein it is stored exactly in the status with which it emerged from block 66. SAVE block 73 also sends data at this time to an option-implementing block 74. If the space-availability answer is NO, the user received an alert and notification to this effect. Blocks 68, 70, 72 form portions of printer controller 14a.

If the determination which is made by either of blocks 70,72 yields a NO answer, no storage takes place, and control is handed to above-mentioned block 74 (also a portion of printer controller 14a) which attends to any of the print-appearance/print-protocol options that the user may have selected (blocks 53,54). Such attending means that the printer controller arms the print-control data stream with sufficient information to cause the selected options ultimately to be implemented.

Data processed through block 74, which is effectively a full and accurate copy of the "option enhanced" (if any) print-control data stream, is supplied through block 76 (referred to as output structure in the printer, previously mentioned dashed bracket 14e) back to computer 12, and via the computer to display screen 16a. This output data stream, a copy of the print-control data stream, is referred to herein as a true print-preview data stream.

With but a single-page document having been created, the appropriate, single-page true print preview is made available to the user, who can then determine whether the document "look" is acceptable or not, and thus whether it should be printed, or revised.

With regard to this output of preview information from block 76, block 76, via an output channel shown by line/arrow 78, has also communicated to a decision block 80 that a document page has been sent to the computer. Block 80 queries whether that is the last page to be handled, which in this case it is since it is the only page. Accordingly, the YES exit path from block 80 is followed to END block 82, which then ends the current preview process within the printer.

Were there more pages to the created document, then, during the true print preview process, the NO route would have been followed out of decision block 80, and the operations of previously described blocks 62-80, inclusive, would have been repeated for each and every additional page.

For each true print preview page presented on screen 16a, the user can, after making any desired revisions based on reviewing the preview, continue this just-described process until the returned and displayed true print preview looks acceptable. At that point in time, the user can elect to print the document, or to save it on hard drive 14b for later printing, without requesting any further true print previews.

A decision at this time (or any other) point in time to print a document without then also requesting a print preview results in a somewhat modified flow of activities through the blocks pictured in FIG. 5. This modified flow is now described in a situation where the pages of the document to be printed have not been stored on the hard drive. To begin with, after the user requests printing, the NO route is followed out of decision block 51, and therefore also later out of decision block 68. The NO route out of block 68 hands control to SEND TO PRINT block 84 which sends the appropriate print-control data to print engine 14c, which then begins printing. Block 84 also at this time sends a signal to decision block 80, which then responds in much the same way as was described for it earlier herein.

A decision to print a stored document results in slightly different behavior. This behavior begins with a flow of activity out of block 51 following the NO route, and later following the YES route out of decision block 62. From this YES route, control is handed to RETRIEVE block 86 which functions to retrieve pages of the particular stored document from the hard drive for printing.

In systems 30 and 40 pictured in FIGS. 3 and 4, respectively, true print preview requests are similarly handled. However in these two systems, the respective, employed electronic display screens reside in the computer (FIG. 3) and the printer (FIG. 4), respectively. With these display-screen differences taken into account, the operations of these two other systems are substantially the same as the operation just described above for system 10.

An additional option which can be made available to a user if desired, is the option to have whatever printer is involved deliver true print-preview data to any connected display screen.

The invention thus effectively solves significant print-preview problems of the past. It does so fundamentally by calling upon the printer in a computer/printer system to take on and directly control the creation of all requested print previews. Such previews therefore all are presented to a user as real, true print previews.

While several forms of the invention (method and structure) have been illustrated and described herein, it is understood that variations and modifications can be made without departing from the spirit of the invention.

I claim:

1. A user method utilizing the printer controller in a printer for producing a true print-preview display in the setting of computer structure which is operatively associated both with a screen-display device, and with a printer having a printer controller that is operatively connected to the computer structure, said method comprising from a document-creating application in the computer structure creating a document, and with reference to the created document, sending a set of related document-printing instructions from the computer to the printer, in association with said sending, enabling user requesting from the printer of a print-preview display, implementing said requesting via a path which enables user selection of selectable printing look and format options relating to print aesthetic appearance, spatial and positional page-appearance relationships, and protocol, wherein the enabled options are selectable from the list including (a) asking for document rendition in a selected one of different color formats, in a grey-scale format, or in a bi-tonal format, (b) instructing the printer to handle related document data in a selected state of data compression and/or bit depth, (c) instructing the printer to handle related document data at a selected level of resolution, and (d) asking that all or some selected portion of a requested print-preview display be presented in thumbnail fashion, enabling user selection of one or more of such options to be included in the print preview request in association with such sent instructions, in the printer, on the basis of such sent instructions, generating, via operation of the printer's printer controller, a collection of document print-control data which the printer will directly use to print the created document, and in response to the print-preview display request, sending back to the computer structure a print-preview data stream based exactly upon the generated print-control data collection as affected by any such user-selected options, and through cooperative interaction between the computer structure and the screen-display device, creating on the screen-display device from that sent back data stream a true print-preview display which exactly shows what the printer will print from the associated, underlying print-control data collection, with such display being affected by any such user-selected options.

* * * * *